INVENTORS
MICHEL AGON
JACQUES JEANNIOT
YVES POUPON

BY William J. Schelberg
AGENT

Aug. 25, 1964 M. AGON ETAL 3,146,426

MEMORY SYSTEM

Filed June 30, 1959 3 Sheets-Sheet 3

United States Patent Office 3,146,426

Patented Aug. 25, 1964

3,146,426

MEMORY SYSTEM

Michel Agon, Courbevoie, and Jacques Jeanniot and Yves Poupon, Paris, France, assignors to International Business Machines Corporation, New York, N.Y., a corporation of New York Filed June 30, 1959, Ser. No. 824,098

6 Claims. (Cl. 340—174)

This invention relates to data handling and transfer systems and more particularly to memory matrices wherein the data stored may be read out and re-recorded into the same or another storage position within the matrix.

Memory matrices employed in today's electronic computing and data handling systems employ bistable elements to store information in binary form. These bistable elements usually, although not necessarily, take the form of toroidal magnetic chores having at least two stable states of residual magnetization arbitrarily designated as representing a binary 1 and a binary 0 as is fully described by R. K. Richards in his book entitled, "Digital Computer Components and Circuits," published by the D. Van Nostrand Co., Inc., pp. 354–395. As related in this book, the positive state of residual magnetization may be arbitrarily defined as a binary 1 while the opposite, or negative state, is defined as a binary 0. Writing information into a core is defined as switching a core to the 1 state, while reading is defined as applying sufficient magnetomotive force (M.M.F.) to a core to switch it to the 0 state. Upon reading, if the core or cores read were previously in the 1 state, a large flux change occurs with a corresponding large voltage developed on a sense line which is inductively associated with each core in a given plane of cores within a matrix, while if the core were previously in the 0 state a very small or negligible voltage is induced on the sense line. In such an operation, reading of the cores always leaves the core or cores in the 0 state and, in effect, the information stored therein is destroyed. Thus, if continued storage is to be obtained, circuits must be provided to reinsert a 1 in the core each time a 1 is sensed.

In recognition of the desirability to preserve information retained in a particular core, various arrangements have been conceived, such as multipath core circuits having the provision of non-destructive read-out or the use of two cores per bit of information. Although such arrangements have accomplished the desired non-destruction of information by re-recording circuits and the like, they fail to provide both the re-recording of information back into the core wherein it was read-out and the provision for re-recording of this information, when desired, into a different position within the matrix.

The desirability of a memory wherein information may be read-out and re-recorded into the same position originally occupied, termed Normal type scanning, or alternately to be re-recorded into a different position in the memory, termed Shifted type scanning, is immediately apparent when the data within a system is to be processed in serial fashion. Consider for example the arithmetic switching function of multiplication wherein the multiplier, the multiplicand and partial products are utilized simultaneously but must be processed differently. During any one operation, they must be switched from one scanning mode to another. In this selected example, each multiplicand is scanned Normal, whereas each partial product must be scanned Shifted. The same type reasoning is seen to be true for switching operations involving addition, subtraction, counter-operations, conversion of a serial operation to a parallel operation, determination of a numbers complement, code conversion, half adjusting and/or straightforward transfer as a shift register. In order to manifest such operations in the systems heretofore contemplated there have been incorporated therein, as an integral part, a shifting register which, apart from necessitating additional hardware, requires time allocation substantially reducing operational speeds.

Accordingly, it is a prime object of this invention to provide a memory which eliminates the extra time allocated to shift information externally before re-entry therein.

A further object of this invention is to provide a memory capable of reading out data stored therein and to re-record this data either in the same storage position or in another position.

These and other objects are achieved by constructing a memory in accordance with this invention wherein a memory plane of bistable elements, magnetic cores, comprising $m$ columns and $n$ rows is provided with each row conductor threading each core in a particular row in one sense and the cores of the next adjacent row in an opposite sense with means for selectively energizing alternate one of the row conductors. Separate column conductors adapted to provide a half select current for the reading and writing operation, respectively, is also provided for each of the $m$ columns of cores. Each core in the memory is threaded by a first conductor of the row in which it is in and a second conductor of the next adjacent row. The first conductor is adapted to apply a half-read selection current when energized, while the second conductor is adapted to apply a half-write selection current when energized. The first conductor of each alternate row of cores is commonly connected at one end to a first selection line while similarly the first conductor of the remaining rows of cores is commonly connected to a second selection line. Since the first conductor of each row is serially connected with the second conductor of the next adjacent row, the second conductor of each row of cores is connected to a row switch.

In the preferred embodiment of this invention, which is constructed in the above related manner, a particular core in one plane of a memory, say the second core of the second row, is selected by closure of the first and second row switches; energization of the first selection line and coincident energization of a column conductor in the second column to provide a half-read current. It may be seen that even though the first and second row switches are closed, energization of the first selection line provides a current through the first conductor of the second row and the second conductor of the first row through the closed first row switch which half-reads the cores in the second row and half-writes the cores of the first row only. Thus the second core of the second row is switched from the 1 to the 0 state, assuming it was previously left in the 1 state, and an output signal is induced on a common sense line for that plane. When this information is to be re-recorded, the same switches are kept closed and an alternate conductor of the second column is energized to provide a half-write current. Depending upon the operation desired, that is, whether the information originally read-out is to be re-recorded Normal or Shifted, one of the first and second selection lines is energized with a half-select current. To re-record the information in the same position, the second selection line is energized, causing energization of the first conductor of the third row and the second conductor of the second row through the second row selection switch. This selection then provides the cores of the second row with a half-write current and the cores of the third with a half-read current which, in combination with the column selection current, switches the second core of the second row to the 1 state. If, however, the information were to be re-recorded to a shifted position, the second core of the first row, the first selection line is energized which, as stated above, provides a half-write current to the cores of the first row and a half-read current to the cores of the second row which switches the second core of the first row to the 1 state upon coincident energization of the appropriate column conductor as stated above.

The foregoing and other objects, features and advantages of the invention will be apparent from the following more particular description of a preferred embodiment of the invention, as illustrated in the accompanying drawings.

In the drawings:

FIGURE 1 indicates how FIGURES 2 and 3, which represent the information transfer assembly, are to be assembled.

Figure 5:
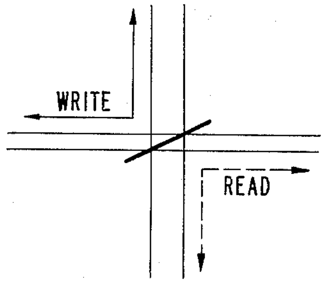
FIGURE 5 represents a core and indicates the direction of the read-out and recording half currents.
Figure 1:
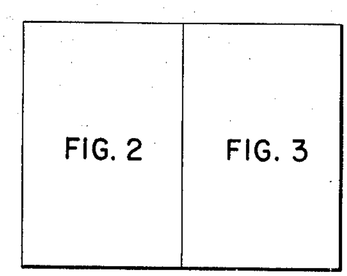
Figure 2:
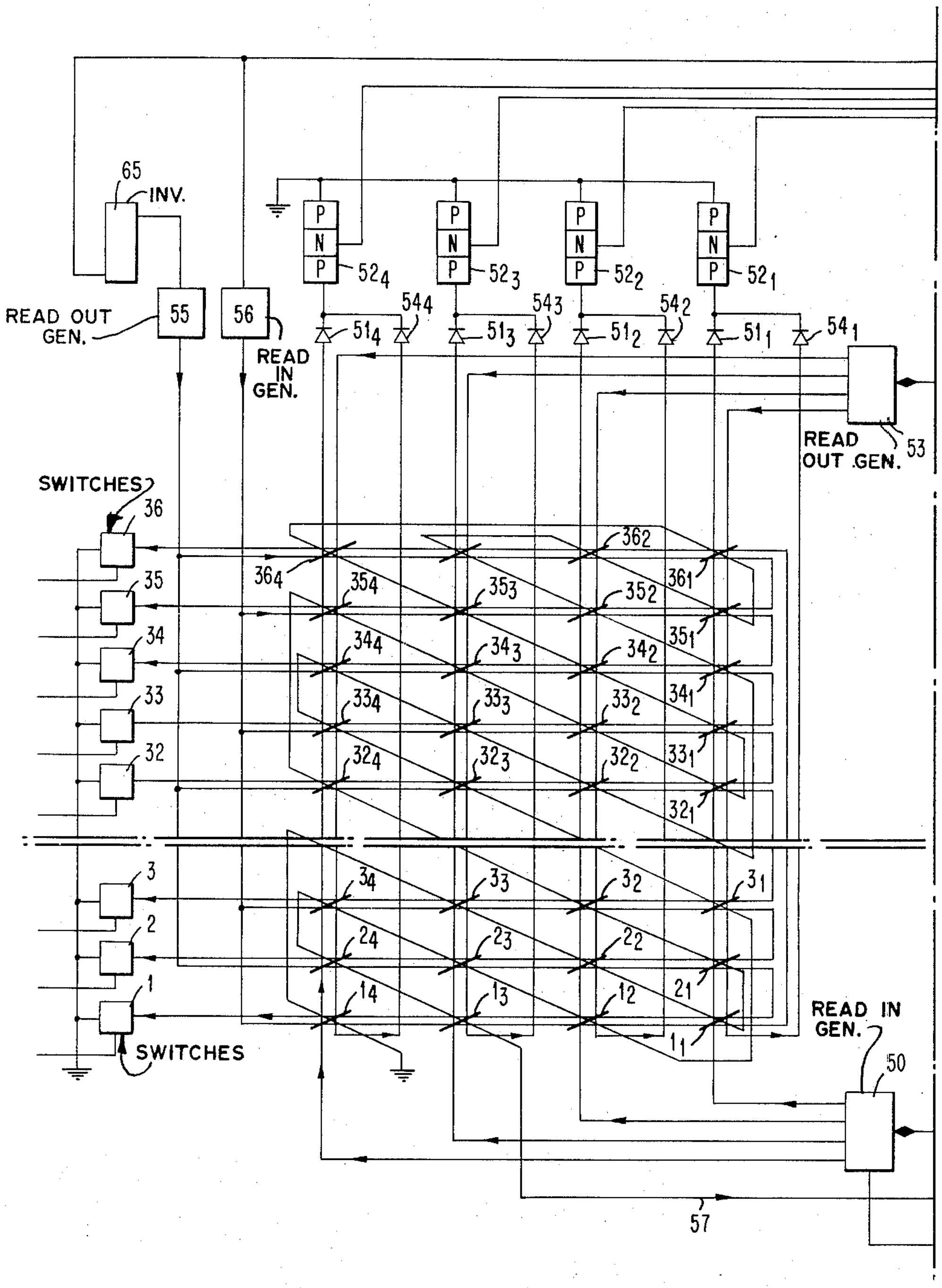

This invention concerns more particularly the memories to be used in the electronic computing machines and composed of any elements able to assume two stable states. In the described example, these bistable elements are magnetic cores, but it is obvious that the invention might as well apply to ferroelectric conductors or any other tubes or transistor triggers, etc. These magnetic cores are preferentially annular. They are represented in FIGURES 2 and 5 by an oblique line; they may assume two stable magnetic states characterized by a negaitve or positive remanent induction and are thus able to be recorded into or read from a binary information; the arbitrarily selected bit value 0 corresponds to a saturation magnetic state, and the bit value 1 corresponds to the other stable state. The application of a magnetic field +2H causes the core to be switched from state 0 to state 1, and thus to record an information; the application of a magnetic field —2H switches it back to zero, thus generating an output pulse, whereas a field +H or —H does not switch the core.

In the described example, the memory is composed of 144 magnetic cores, arranged as desired. In FIGURE 2, it will be assumed that the cores are arrayed in four columns comprising each 36 cores. The cores will be designated by $\mathbf{1}_1$, $\mathbf{1}_2$, $\mathbf{1}_3$, $\mathbf{1}_4$, $\mathbf{2}_1$, $\mathbf{2}_2$, $\mathbf{2}_3$, $\mathbf{2}_4$ . . . $\mathbf{35}_1$, $\mathbf{35}_2$, $\mathbf{35}_3$, $\mathbf{35}_4$, $\mathbf{36}_1$, $\mathbf{36}_2$ $\mathbf{36}_3$, $\mathbf{36}_4$, the digit indicating the row, and the subscript, the column. For simplification sake, only rows 1, 2, 3, 32, 33, 34, 35 and 36 have been represented, rows 4 to 31 being similar to the others.

The memory cores support five windings, two for recording, two for reading-out, and the fifth being the output winding. A winding may comprise one single coil or any number of coils, but, for simplification sake they are represented as comprising one coil. In FIGURE 5, there are represented the directions of the two recording, or read-in, currents generating each a magnetic field +H, their combination resulting in applying a magnetic field +2H to switch the core to magnetic state 1, and to record an information therein. During the read-in time, generator 50 applies a recording half current to the 36 read-in windings serially mounted along a column. The four outputs of generator 50 are serially connected with the windings of the corresponding column and the circuit is made through ground, through the four diodes $\mathbf{51}_1$, $\mathbf{51}_2$, $\mathbf{51}_3$ and $\mathbf{51}_4$, then the four column selecting switches. These four switches may be of any type, such as, for example, transistors $\mathbf{52}_1$, $\mathbf{52}_2$, $\mathbf{52}_3$ and $\mathbf{52}_4$.

In FIGURE 5, there are represented with dotted lines the read-out, or sensing, currents, generating each a magnetic field —H, the combination of the two magnetic fields subjecting the core to a field —2H, to bring it back to saturation state zero. The 36 read-out or sensing windings of the 36 cores of a column are serially connected; during the read-out time, they are applied a reading half current from one of the four outputs of the reading pulse generator 53; on another hand, they are connected to ground through the four diodes $\mathbf{54}_1$, $\mathbf{53}_2$, $\mathbf{54}_3$, and $\mathbf{54}_4$, and the four column selecting switches $\mathbf{52}_1$, $\mathbf{52}_2$, $\mathbf{52}_3$ and $\mathbf{52}_4$.

The four read-in windings of the four cores of a same row are serially connected with the four read-out windings of the four cores of the upper line. Thus for example the four recording windings of cores $\mathbf{2}_1$, $\mathbf{2}_2$, $\mathbf{2}_3$ and $\mathbf{2}_4$ are serially connected with the four read-out windings of cores $\mathbf{3}_1$, $\mathbf{3}_2$, $\mathbf{3}_3$ and $\mathbf{3}_4$. The four read-in windings of cores $\mathbf{36}_1$, $\mathbf{36}_2$, $\mathbf{36}_3$ and $\mathbf{36}_4$ of row 36 are serially connected with the read-out windings of cores $\mathbf{1}_1$, $\mathbf{1}_2$, $\mathbf{1}_3$ and $\mathbf{1}_4$ of the first row. Each group of eight windings is connected on one hand to ground through the corresponding switch 1, 2, 3 . . . 35 and 36, which permits to select one row, and on the other hand to one of the two pulse generators 55 or 56. The odd switches are connected to generator 55 and the even switches to generator 56.

The output windings of all 144 cores are serially wired; they are represented by an oblique line 57. Said line 57 crosses as many cores in one direction as in the other, so that noise is compensated for.

Both ends of this output line are adjacent to each other and the loop made by this line is reduced so as to limit spurious induction from external fields.

It is obvious that the memory might be made of any number of cores, and these might be arranged in another way. The herein described embodiment is but illustrative.

Let it be assumed that the operation to be performed is an addition. The two numbers A and B to be added have been inserted into the apparatus, for example from a punched card; by any process, these two numbers are converted into binary numbers and respectively recorded into two different areas, for example in columns 1 and 2 of the memory. Each row corresponds to a power of two except row 1 which stores the sign; row 2 corresponds to the least significant digit, and row 35 to the most significant order. The operation consists in computing $A+B$, in preserving A after the operation, but in recording $A+B$ in the location where B was stored, the result of the operation replacing one of the two terms as the adding operation is performed. First, the first binary element of A is read, then re-recorded into the location wherein it was stored, while it is recorded in an adder. Then, the first binary element of B is read, sent to the adder, then the sum of the two first terms of A and B is recorded in that position. The operation is performed now on the second terms of A and B, taking into account the possible carries, and so on for the following terms. Alternately, therefore, for all the positions of the memory areas, column A and column B, the reading operation is followed with a recording operation. Thus, the two scannings of positions A and B are performed normally. In such a case, the combination of the two scannings to be effected, therefore, is "A normal," "B shifted."

Let it be assumed now that the operation to be effected is a multiplication. A will be the memory area wherein the multiplicand is stored, C that wherein the multiplier is stored, and B, that for the result. The operation first consists in transferring number A in area B, so as to make out the first partial product, if the least significant bit of C is 1. However, if the binary element of C is null, the preceding partial product B must be shifted one order without being added to number A. In the first case, the scanning of the positions of area A is normal, that of area B is shifted. "A normal, B shifted." In the second case, it is enough to scan one memory area: B; therefore, the scanning to be performed is "B shifted." Moreover, to be sure that the multiplication is completed it is necessary to count the number of elementary operation cycles. The counter may be another memory area, for example the fourth column, an information is recorded in the core corresponding to row $n$ when it is desired, for example, to count up to $n$. This information is shifted one order in the decreasing direction during each cycle, so as to reach position 1 during the *n*th cycle. This counting, as well as the operation of the memory area as a shift register, requires a shifted scanning.

It is obvious that the performance of a division requires a scanning combination: "A shifted, B normal."

In the illustrative embodiment, three possible scanning modes may be realized with two memory areas: "A normal, B normal," "A shifted, B normal," and "A normal, B shifted," and a fourth mode may be realized when operating one single memory area "B shifted." The described apparatus provides a convenient inexpensive system permitting the realization of these four different types, and an easy switching from one type to another. There might be conceived scannings combined according to a method different from the four selected modes; to realize them, it would suffice to adapt the described examples to these other scanning modes. Before describing how these four scanning types are obtained and how other types might be obtained, it is advisable to study the timing of the various organs of the apparatus, their timing relations with one another as well as their timing diagram (see FIGURE 4).

Figure 3:
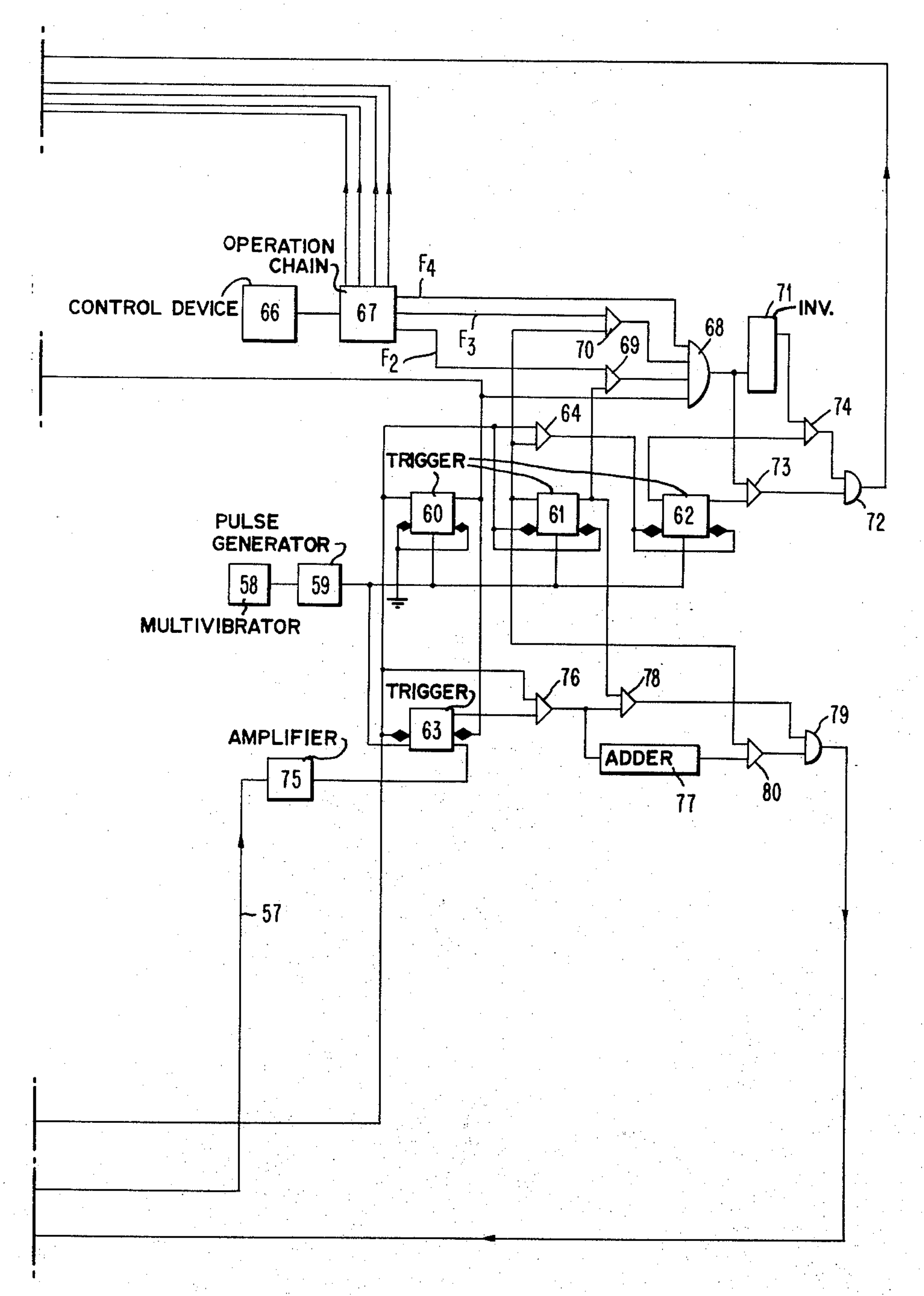

A multivibrator designated by 58, FIGURE 3, generates rectangular signals which are applied to a pulse generator 59. The output pulses of generator 59 are represented in curve 1 of FIGURE 4. They are applied to the binary input of three triggers 60, 61 and 62. All these organs, multivibrators, pulse generators, triggers, inverters, logical circuits, etc. may be of any type; they may indifferently be composed of tubes, transistors, diodes, etc. The triggers may assume two different stable states: an ON state, and an OFF state. They have two output terminals shown in the upper part of the block representing the trigger, the voltage at the right output terminal increases when the trigger is ON, and on the left output terminal when the trigger is OFF. The input terminals of the triggers are shown in the lower part of the block, one on the right, one on the left, and one in the middle; trigger 63 comprises four inputs. The terminals marked with a lozenge, also called slow input terminals, favor the switching of the trigger, the right one to switch it ON, and the left one to switch it OFF. A pulse applied to the right input terminal of 63 switches it ON if the lozenged right input terminal is energized. The left input terminal switches it OFF, if the lozenged left terminal is energized. In triggers 60, 61 and 62, the latter two terminals are merged into one so-called binary terminal, which switches the trigger, whatever may be its initial state, both lozenged terminals being energized. Pulses from generator 59 are applied to the binary input terminal of trigger 60. The two slow input terminals are connected to ground thus continuously favouring the switching of trigger 60. Thus the switching of trigger 60, which is indicated in curve 2 of FIGURE 4 will be modified on each pulse from 59. Trigger 60 determines alternately a so-called read-out period when trigger 60 is ON, and a so-called read-in period, 60 being OFF. Actually, when 60 if ON, the voltage at the right output terminal is increased, thus permitting the energization of reading pulse generator 53. On another hand, the left output terminal of 60 is connected to the recording generator 50 which therefore can apply recording pulses only if trigger 60 is OFF.

The left output terminal 60 is connected to both input terminals of trigger 61, thus favouring the switching of trigger 61 only when trigger 60 is OFF. Trigger 61 is switched but once when trigger 60 has been switched twice. The switching frequency of 60 is double of that of 61. Curve 3, in FIGURE 4, indicates the operation time of 61. Trigger 61 alternately determines a time, so-called time A, when 61 is ON, and a so-called time B when 61 is OFF. Since the period of 61 is double of that of 60, and since both triggers are synchronized, time A is subdivided into two bit times, the first one for reading, and the second one for recording; the same may be said of time B. Both these times A and B are used to determine two memory areas, areas A and B. Thus will be alternately determined a reading, or read-out, time in area A, then a recording, or read-in, time in area A, followed with a reading time in area B and a recording time in B. Then again, this cycle is repeated for the adjacent location, until all areas are scanned.

Figure 4:
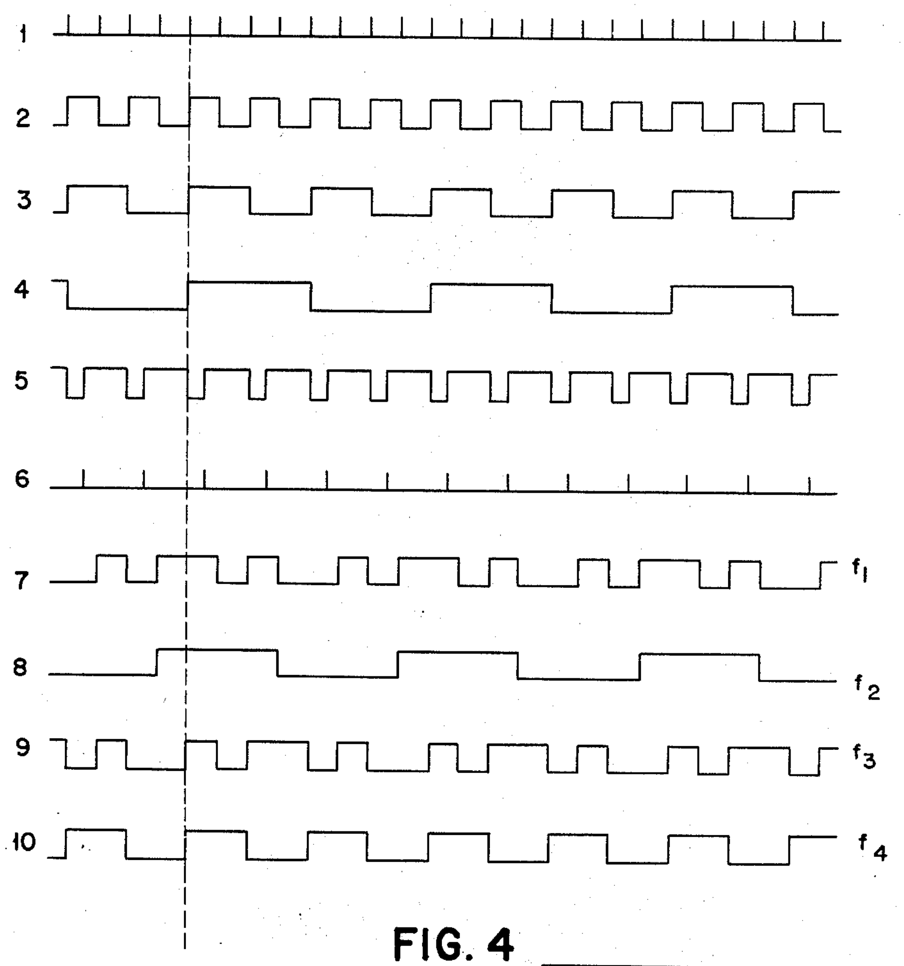
FIGURE 4 represents the timing diagram of the various elements of which the preceding figures are composed.

The left output terminals of both triggers are connected to the two input terminals of logical AND circuit 64, therefore a signal appears at the output of circuit 64 but when both triggers 60 and 61 are simultaneously OFF. The output of 64 is connected to two slow input terminals of trigger 62, the binary input of which receives the pulses of curve 1, FIGURE 4. Trigger 62, the operating time of which is indicated in curve 4, FIGURE 4, is switched but if both triggers 60 and 61 are simultaneously OFF. The period of trigger 62 being double of that of 61, trigger 62, therefore, permits to define the parity of the memory rows, since 62 is switched but when trigger 61 has been switched twice.

These three triggers 60, 61 and 62 permit to determine which scanning mode has been selected.

The read-out of the information recorded into a core, for example core $34_2$, at the intersection of row 34 and column 2, requires a first reading half-current produced by generator 53, while switch $52_2$ of column 2 is closed, and a second reading half-current supplied by generator 55 when switch 33 of row 33 is closed. The recording of an information in that same core $34_2$ requires a first recording half-current supplied by generator 50, while switch $52_2$ keeps closed, and a second recording half current produced by generator 56 when switch 34 is closed.

If the information read-in a core of row $n$ must be re-recorded, the read-out will be realized by closing switch $(n-1)$ corresponding to row $n-1$, and the re-recording, by closing switch $n$. Actually, the closing of switch $n$ permits the re-recording in row $n$, but the read-out of row $(n+1)$.

If the information read from a core of row $n$ must be re-recorded with a shift, i.e., in the core of row $(n-1)$, the reading will be made by closing switch $(n-1)$, and the re-recording, by maintaining switch $(n-1)$ closed.

When the information processed is that from the core of row $n$, so that the reading as well as the re-recording, with or without shift, may be effected, it is sufficient to maintain closed the switches of both adjacent lines $n$ and $n-1$, but the two switches will not be ON simultaneously, the selection therebetween is made by an additive control, that of the two generators 55 and 56. All odd switches are connected to the odd generator, 55 and all even switches to the even generator 56, when two adjacent switches are closed, for a given row of the memory, the scanning mode used will be defined by the operation law of generators 55 and 56. This operation law of generators 55 and 56 will be studied for the four previously described scanning modes.

*First Scanning Mode "A Normal, B Normal"*

For a memory location reached by the scanning chain, the following chart will provide: the memory area A or B where is the location to be processed, the operation to be performed: read-out or read-in, the switches to be closed, the odd or even generator 55 or 56 to be used.

(1) Scanning chain position
(2) Memory area
(3) Operation to be performed: read-out or read-in
(4) Selected switch
(5) Energized generator

| | | | | | | | | | | | |
|---|---|---|---|---|---|---|---|---|---|---|---|
| (1) | 1 | 1 | 1 | 1 | 2 | 2 | 2 | 2 | 3 | 3 | 3 |
| (2) | A | A | B | B | A | A | B | B | A | A | B |
| (3) | RO | RI | RO | RI | RO | RI | RO | RI | RO | RI | RO |
| (4) | 36 | 1 | 36 | 1 | 1 | 2 | 1 | 2 | 2 | 3 | 2 |
| (5) | 56 | 55 | 56 | 55 | 55 | 56 | 55 | 56 | 56 | 55 | 56 |

It is obvious that if two consecutive switches are closed simultaneously, even if only one of them is actually used, for the first four cycles, these two switches will be 36 and 1, for the four following ones 1 and 2, then 2 and 3, and so on as the scanning progresses. The simultaneous closing of these two switches, then the closing of the two following ones, etc. is controlled by a trigger chain of any type, or else by a combination of two trigger chains which permit to define a total of 36 successive times to locate 36 rows of the corresponding memory. This chain which does not pertain to the invention has not been represented on the figure.

The order according to which of the generators 55 or 56 are energized is given in the last line of the above chart; it is directed by a rule which has been represented in curve 7 of FIGURE 4, from starting point determined by the dotted vertical line. Supposing that the function represented by that curve may assume two possible values, 0 and 1, it suffices that odd generator 55 should be picked up when it is equal to 0, while even generator 56 is energized when it equals 1. Before seeing how this function may be realized, we shall see which are the other functions to realize to control the various other scannings.

*Second Scanning Mode: "A Shifted, B Normal"*

(1), (2), (3), (4), (5), as above; (6) closed switches

| | | | | | | | | | | | | |
|---|---|---|---|---|---|---|---|---|---|---|---|---|
| (1) | 1 | 1 | 1 | 1 | 2 | 2 | 2 | 2 | 3 | 3 | 3 | 3 |
| (2) | A | A | B | B | A | A | B | B | A | A | B | B |
| (3) | RO | RI | RO | RI | RO | RI | RO | RI | RO | RI | RO | RI |
| (4) | 36 | 36 | 36 | 1 | 1 | 1 | 1 | 2 | 2 | 2 | 2 | 3 |
| (5) | 56 | 56 | 56 | 55 | 55 | 55 | 55 | 56 | 56 | 56 | 56 | 55 |
| (6) | 3—1 simult. | | | | 1—2 simult. | | | | 2—3 simult. | | | |

We see that, according to the preceding scanning, during the first four cycles, the two switches, 36 and 1 are simultaneously closed during the four following cycles 1 and 2, then 2 and 3. Thus, the operation of the scanning chain, and the making of the row switches is similar to those of the preceding scannings.

The function which controls generators 55 and 56 is different; it is that provided by curve 8 of row 4 from a starting point determined by the dotted vertical line.

*Third Scanning Mode: "A Normal, B Shifted"*

| | | | | | | | | | | | | |
|---|---|---|---|---|---|---|---|---|---|---|---|---|
| (1) | 1 | 1 | 1 | 1 | 2 | 2 | 2 | 2 | 3 | 3 | 3 | 3 |
| (2) | A | A | B | B | A | A | B | B | A | A | B | B |
| (3) | RO | RI | RO | RI | RO | RI | RO | RI | RO | RI | RO | RI |
| (4) | 36 | 1 | 36 | 36 | 1 | 2 | 1 | 1 | 2 | 3 | 2 | 2 |
| (5) | 56 | 55 | 56 | 56 | 55 | 56 | 55 | 55 | 56 | 55 | 56 | 56 |
| (6) | 36–1 simult. | | | | 1–2 simult. | | | | 2–3 simult. | | | |

As in the two preceding scannings, two adjacent switches are closed during each group of four cycles, the control of the scanning chain is still identical to the preceding ones.

According to the fifth line of the chart, the function controlling generators 55 and 56 is given by curve 9 of FIGURE 4, from the starting time determined by the dotted vertical line.

*Fourth Scanning Mode: "B Shifted"*

This scanning mode corresponds to the operation of one single memory area, for example area B; then trigger 61 is kept OFF during the whole operation time. As the pulses emitted by 59 switch trigger 62 but if both triggers 60 and 61 are simultaneously OFF, its condition will be modified twice as quickly, and its operation time is the same as that of curve 3 in FIGURE 4. On a simple shift, the scanning will be made twice as quickly:

| | | | | | | |
|---|---|---|---|---|---|---|
| (1) | 1 | 1 | 2 | 2 | 3 | 3 |
| (2) | B | B | B | B | B | B |
| (3) | RO | RI | RO | RI | RO | RI |
| (4) | 36 | 36 | 1 | 1 | 2 | 2 |
| (5) | 56 | 56 | 55 | 55 | 56 | 56 |
| (6) | 36 and 1 simult. | | 1 and 2 simult. | | 2 and 3 simult. | |

According to this fourth scanning mode, the two adjacent switches are closed simultaneously, out of which one is used. But the operation of the scanning chain which controls the order in which the row switches close is the same as that of the three preceding scanning modes.

According to the fifth line of the chart, the function controlling the energization of generators 55 and 56 is given in curve 10 of FIGURE 4.

To switch from one scanning mode to another, it is of no use to change the closing order of the row switches; it will suffice to change the energization order of generators 55 and 56; the four functions determining said order and represented by curves 7, 8, 9 and 10 respectively, of FIG. 4 are designated by $f_1$, $f_2$, $f_3$ and $f_4$. It is the program to be realized by the apparatus which must select which of these four functions is to be used to control even pulse generator 56, it being obvious that the complement of that function will serve to control odd pulse generator 55. It is the function of inverter 65 to switch from one function to the complementary function, so that, if generator 56 must be picked up, generator 55 will not, and conversely.

The program to be realized is determined by a device 66 which is not within the scope of the invention. Said device controls an operation chain 67. This chain is represented by a square having upper output terminals for controlling the bases of transistors 52, so as to control the closing of the switch of the column wherein the core to be processed is located.

Thus, for example, the two areas A and B are determined alternately during times A and B defined by trigger 61. The operation chain 67 further permits to select the function which must control pulse generator 56, the three right output terminals of 67, designated by $F_2$, $F_3$ or $F_4$ respectively, permit to select generator 56 control function. It is useless to provide an additive terminal $F_1$ because, if none of terminals $F_2$, $F_3$, $F_4$, is applied a signal, function $f_1$ will automatically be performed. The apparatus has been thus conceived because the scanning "A normal, B shifted" which corresponds to function $f_1$ is, out of the four scanning modes, the more frequently used.

It is obvious that other scanning modes might be imagined than the four selected ones, to which there would correspond other similar functions $f_5$, $f_6$, etc.

In logical algebra, let us designate by $x$, $y$ and $z$ the three variables which may assume value 0 or 1, according whether trigger 60 (for variable $x$), 61 (for variable $y$) and 62 (for variable $z$) are OFF or ON. The canonic form for logical functions $f_1$, $f_2$, $f_3$ and $f_4$ may be determined by formula:

$$f(xyz)=\bar{x}\,\bar{y}\,\bar{z}f(000)+\bar{x}\,\bar{y}zf(001)$$
$$+\bar{x}y\bar{z}f(010)+\bar{x}yzf(011)+x\bar{y}\,\bar{z}f(100)$$
$$+x\bar{y}zf(101)+xy\bar{z}f(110)+xyzf(111)$$

To compute, for example, logical function $f_3$, let it be referred to the following chart established from curves 2, 3, 4 and 9, and corresponding to $x$, $y$, $z$, and $f_3$.

| $x$ | $y$ | $z$ | $f_3$ |
|---|---|---|---|
| 1 | 1 | 1 | 1 |
| 0 | 1 | 1 | 0 |
| 1 | 0 | 1 | 1 |
| 0 | 0 | 1 | 1 |
| 1 | 1 | 0 | 0 |
| 0 | 1 | 0 | 1 |
| 1 | 0 | 0 | 0 |
| 0 | 0 | 0 | 0 |

By replacement in the preceding formula, we get function:

$$f_3=\bar{x}\,\bar{y}z+\bar{x}y\bar{z}+x\bar{y}z+xyz$$
$$f_3=\bar{x}\,\bar{y}z+\bar{x}y\bar{z}+xz(y+\bar{y})$$

but $$y+\bar{y})=1$$
$$f_3=\bar{x}\,\bar{y}z+\bar{x}y\bar{z}+\overline{xz}$$
$$f_3=z(x+\bar{x}\,\bar{y})+\bar{x}y\bar{z}$$

and, by replacing $$(x+\bar{x}\,\bar{y}) \text{ by } (x+\bar{y})$$

$$f_3=z(x+\bar{y})+\bar{x}y\bar{z}$$

By a similar computation, one would get the other functions:

$$f_1=xz+\bar{x}\,\bar{z}$$

$$f_2=z(x+y)+\bar{x}\,\bar{y}\,\bar{z}$$

$f_4=z$, since $y=0$. Trigger 61 is OFF.

Let it be supposed that $F_1$ is a function equal to 1, when function $f_1$ is to be obtained and equal to 0 when it is not to be obtained; similarly, functions $F_2$, $F_3$ or $F_4$ will be functions which are equal to 1 or to 0, according whether functions $f_2$, $f_3$, $f_4$, are to be realized or not. Function $F_2$, $F_3$, $F_4$ is equal to 1 when there appears a signal on the corresponding output of device 67. If there appears no signal on any of the three outputs, $F_2$, $F_3$ or $F_4$, it is function $F_1$ which is equal to 1.

The logical expression of a function $f$ realizing the whole of the four functions $f_1$, $f_2$, $f_3$ or $f_4$, according to the selected control signal, $F_1$, $F_2$, $F_3$ or $F_4$, is given by the formula:

$$f=f_1F_1+f_2F_2+f_3F_3+f_4F_4$$

This formula may be generalized to when it is desired to select between 5 or 6 different scanning modes.

If for example $F_1=1$, and the three others $$F_2=F_3=F_4=0$$

the result is actually $f=f_1$, which is the function to realize then. Thus:

$$f=(xz+\bar{x}\,\bar{z})+[z(x+y)+\bar{x}\,\bar{y}\,\bar{z}]F_2 +[z(x+\bar{y})+\bar{x}y\bar{z}]F_3+zF_4$$

Taking into account the relations existing between $F_1$, $F_2$, $F_3$ and $F_4$, since one only out of these four functions is equal to 1, whereas the three others are null, that is:

$$1=F_1\bar{F}_2\bar{F}_3\bar{F}_4+\bar{F}_1F_2\bar{F}_3\bar{F}_4+\bar{F}_1\bar{F}_2F_3\bar{F}_4+\bar{F}_1\bar{F}_2\bar{F}_3F_4$$

The function may be simplified into:

$$f=uz+\overline{uz} \text{ or } u=(x+yF_2+yF_3+F_4)$$

This function is easy to obtain by means of arrangement of logical circuits.

We see that function $F_1$ is absent from the equation, for $F_1$ is determined if $F_2$, $F_3$ and $F_4$ are known.

Function: $u=(x+yF_2+\bar{y}F_3+F_4)$ is obtained by means of logical four-input OR circuit 68; the four inputs correspond respectively:

1—to function $x$ at the right output of trigger 60.

2—to function $yF_2$ obtained from the output of logical AND circuit 69, two inputs of which are connected on one hand to the right output of trigger 61 (for function $y$) and on the other hand to the output $F_2$ of device 67.

3—to function $yF_3$ obtained at the output of logical AND circuit 70, two inputs of which are connected on one hand to the left output of trigger 61 (for function $y$), and on the other hand to output $F_3$ of device 67.

4—to function $F_4$, from output $F_4$ of device 67.

Function $\bar{u}$, the complement of function $u$, is realized by inverter 71, the input of which is connected to the output of logical OR circuit 72, two inputs of which receive respectively:

1—function $uz$ collected at the output of logical AND circuit 73, two inputs of which are connected to the output of logical OR circuit 68 (for function $u$), and to the right output of trigger 62 (for function $z$).

2—function $uz$ obtained at the output of logical AND circuit 74, two inputs of which are connected to the output of inverter 71 (for function $\bar{u}$), and at the left output of trigger 62 (for function $\bar{z}$).

According to the function, $F_1$, $F_2$, $F_3$ or $F_4$, which is equal to 1, whereas the three others are null, function $f$ will assume value $f_1$, $f_2$, $f_3$ or $f_4$. This function is applied to even pulse generator 56 and under its complementary form to odd generator 55 through inverter 65. It permits the control of the scanning according to the mode desired.

During a program, for switching from one scanning to another, for example from a scanning $f_1$ to a scanning $f_3$, it will suffice that the program to be realized should control a change which cancels function $F_1$ and switches $F_3$ to 1. Thus, the memory may assume several functions: shift register, counter, etc. or may be used to effect arithmetical operations requiring various scanning modes.

To illustrate the operation of the transfer apparatus, the track followed by the information will be described for the case of an addition $A+B$, which may as well be realized during a multiplication cycle when multiplicand A is added to partial product B, the total being recorded into the area previously occupied by B.

During the first cycle beginning from the starting pint: dotted vertical line, FIGURE 4, ON trigger 60 determines a reading time (see curve 2 of FIGURE 4) the right output of 60 allows the energization of the reading pulse generator. Trigger 61 also is ON, i.e., it is a core of memory column A which will be read. Column A is selected by one of switches 52, the row switch scanning chain has reached any location and two adjacent switches are closed. One of generators 55 or 56, according to the selected scanning function, is energized. The information contained in the core at the intersection of the selected row and the column is read. A signal appears on oblique output line 57, if the core saturation state is modified, no signal occurs if the saturation state is not modified. These output signals are in the shape of pulses synchronized with the other operation times; they can appear only in such times as are determined by curve 6, FIGURE 4. These signals, the existence of which corresponds to the presence of an information, and their non-existence to the absence of an information, are applied to the input of amplifier 75. At the output of 75, the amplified signal is applied to the right input of trigger 63. Trigger 63 has its two slow input terminals connected to the two right and left output terminals of trigger 60, so that trigger 63 is favoured to be switched ON during reading time, and to be switched OFF during recording times. The output signals (curve 6, FIGURE 4) which appear during the reading times switch trigger 63 ON. Trigger 63 keeps ON until a pulse (curve 1, FIGURE 4) applied to generator 59 to the left input terminal of 63 coincides with the OFF state of 60 (curve 2, FIGURE 4). The operation time of trigger 63 is indicated in curve 5, FIGURE 4. It is quite obvious that this curve supposes the existence of an information during each cycle. If one of the information data were missing, trigger 63 should keep OFF during some time, up to the appearance of the next information. The right output of trigger 63 is connected to one input terminal of logical AND circuit 76. If there is an information, this terminal of the AND circuit is favoured during the ON time of trigger 63. The second input terminal of AND circuit 76 is connected to the left output terminal of trigger 60; it is therefore favoured during recording, or read-in, times. Thus, a signal occurs at the output of circuit 76, during the recording times, if an information has been read during the preceding reading cycle.

This information is applied to the input of adder 77, to be stored therein; moreover, if it comes from a core of area A, it must be re-recorded. Therefore this information is applied to an input of logical AND circuit 78, the second input of which, connected to the right output of trigger 61, is favoured during times B. The output signal of AND circuit 78 flows through logical OR circuit 79 to energize recording pulse generator 50 which is favoured during the recording times through the left output of trigger 60. The two row switches and the column switch, which were closed during the read out of the core in area A have still kept closed. The recording of the information which has just been read is performed either in the core where the information has been read-out or into the adjacent core, the shift, or no shift being determined by the control of generator 55 or 56, as has been explained previously.

After time A, which is divided into two elementary times: read-out and read-in, trigger 61 is switched OFF, thus defining a time B, which is in turn subdivided into two; read-out and read-in. Switches 52 thus define a new column which will be area B. The two row switches, which were closed during the preceding cycle, keep closed. As in A, a signal appears on output line 57; it is amplified and applied to trigger 63. During the recording time of period B, said signal is transmitted through logical AND circuit 76 to be applied to adder 77. Said signal cannot go through logical AND circuit 78, the second input of which is not favoured during time B. In adder 77, signal B is combined with signal A of the preceding cycle, and possibly with the carry of the preceding operation. The output signal from the adder is applied to an input terminal of logical AND circuit 80, the second input terminal of which is connected to the left output of trigger 61, so that said circuit 80 is favoured but during times B. This is the reason why, during the recording time of period A, the output signal of adder 77 is not transmitted through circuit 80. As a conclusion, during recording time B, the signal $A+B$ appears at the output of circuit 80, through OR circuit 79, to energize recording generator 50. As during time A, this recording is effected while the two row switches and the column switch have kept their contacts closed, and it is the control of generators 55 and 56 which determines whether the recording is made with or without a shift.

And so on, successively, a reading time A is followed with a re-recording time A, then a reading time B, and finally a recording time B. When these four cycles are completed, the scanning chain advances one position and the described operation is repeated.

According to another embodiment, the two row pulse generators, 55 and 56, could be replaced by one generator associated to two switches of any type, one being serially mounted with the even row switches: 2, 4 . . . 34 and 36, and the other with switches 1, 3 . . . 33 and 35. According to this embodiment, the control function $f$ from logical OR circuit 72 would determine the closing order of the contacts of these two switches, and would permit the scanning mode to be selected.

While the invention has been particularly shown and described with reference to a preferred embodiment thereof, it will be understood by those skilled in the art that the foregoing and other changes in form and details may be made therein without departing from the spirit and scope of the invention.

We claim:

1. In an information memory, the combination comprising a plurality of bistable magnetic elements, a plurality of winding means coupling each of said elements including sense winding means, said elements adapted to be switched from an information representative stable state to a datum stable state when the winding means of said elements are energized with a full read select current and further adapted to be switched to the information representative state when the winding means of said elements are energized with a full write select current, a plurality of first selection means connected to a number of the plurality of winding means of said elements, each of said first selection means being adapted to provide a half read select current during a first interval of time and a half write select current during a second interval of time to the number of winding means of the elements connected when energized, a plurality of second selection means connecting other windings of the plurality of winding means on said elements, each of said second selection means being adapted to provide both a half read select current to a first predetermined number of said other windings and a half write select current to a second predetermined number of said other windings during any one of said first and second intervals of time and means for controlling said first and second selection means to read out the information stored in a particular one of said elements during the first interval of time and to re-record this information into one of the plurality of said elements during the second interval of time.

2. In an information memory, the combination comprising a plurality of bistable magnetic elements, read, write and sense winding means on said elements, said elements being adapted to be switched from an information representative stable state to a datum stable state when the read winding means are energized with a full read select current and being further adapted to switch to the information representative state when the write winding means are energized with a full write select current, a plurality of first selection means connecting a read winding of said read winding means and a write winding of said write winding means of said elements and each adapted to provide a half read select current during a first interval of time and a half write select current during a second interval of time to said connected windings when energized, a plurality of second selection means connecting other read windings and other write windings of said read and write winding means, each being adapted to provide both a half read select current to the other read windings of a first predetermined number of said elements and a half write select current to the other write windings of a second predetermined number of said elements in any one of said first and second intervals of time, and means for controlling said first and second selection means when energized to read out the information stored in a particular one of said elements during the first interval of time and to re-record this information into one of a plurality of said elements during the second interval of time.

3. In an information memory, the combination comprising a plurality of bistable magnetic cores arranged in columns and rows, a plurality of winding means on each of said cores including a sense winding, each of said cores being adapted to be switched to a datum stable state when the winding means of said cores are energized by a full read select current and being further adapted to switch to to an information representative state when the winding means of said cores are energized by a full write select current, a plurality of first selection means each connecting a number of the winding means on the cores in different columns and adapted to provide a half read select current in a first interval of time and a half write select current in a second interval of time to the windings of said winding means connected when energized, a plurality of second selection means each connecting a further winding of said winding means on said cores in a first and a second row of said elements and adapted to provide a half read select current to the further windings on the first row of said cores and a half write select current to the further windings of the second row of said cores during any one of said first and second intervals of time when energized and means for controlling said first and second selection means to read out the information stored in a selected one of said cores during the first interval of time and to re-record this information in one of a plurality of said cores during the second interval of time.

4. In an information memory, the combination comprising a plurality of bistable magnetic cores arranged in columns and rows, a plurality of winding means on each of said cores including sense winding means, said cores being adapted to switch to a datum stable state when the winding means thereon are energized by a full read current and further adapted to switch to an opposite stable state when the winding means thereon are energized by a full write current, a plurality of first selection means each connecting a number of windings of said winding means on the cores of different columns and adapted to provide a half read current in a first interval of time and a half write current in a second interval of time when energized, and a plurality of second selection means each connecting a further one of the winding means on the cores of a first and a second row of cores adapted to provide both a half write current to said one windings of the first row and a half read current to said one windings of the second row in any one of said first and second intervals of time.

5. In an information memory, the combination comprising a plurality of bistable magnetic cores arranged in columns and rows; each of said cores having a column read winding, a column write winding, a row read winding, a row write winding and a common sense winding; said cores adapted to be switched to a datum stable state when both of the read windings are energized and further adapted to be switched in an information representative state when both of the write windings are energized; a plurality of column selection means each comprising a pair of circuits respectively connecting the column read and the column write windings of the cores in different columns, and a plurality of row selection means each comprising a circuit connecting the write windings of one row of cores and the read windings of an adjacent row of cores.

6. In an information memory, the combination comprising a plurality of bistable magnetic cores arranged in columns and rows, each of said cores having a column read winding, a column write winding, a row read winding, a row write winding and a common sense winding; said cores being adapted to be switched to a datum stable state when both of the read windings are energized and being further adapted to be switched in an information representative state when both of the write windings are energized; a plurality of column selection means each comprising a pair of circuits respectively connecting the column read and the column write windings of the cores in different columns and a plurality of row selection means each comprising a circuit including the write windings of one row of cores serially connected to the read windings of an adjacent row of cores.

References Cited in the file of this patent

UNITED STATES PATENTS 2,856,596 Miller ---------------- Oct. 14, 1958
2,914,754 Ganzhorn et al. -------- Nov. 24, 1959
2,922,145 Bobeck ---------------- Jan. 19, 1960
2,948,885 Stuart-Williams ---------- Aug. 9, 1960

FOREIGN PATENTS 1,186,856 France ---------------- Mar. 2, 1959

UNITED STATES PATENT OFFICE
CERTIFICATE OF CORRECTION

Patent No. 3,146,426 August 25, 1964

Michel Agon et al.

It is hereby certified that error appears in the above numbered patent requiring correction and that the said Letters Patent should read as corrected below.

Column 3, lines 29 and 30, for "negaitve" read -- negative --; column 4, line 1, for "$53_2$" read -- $54_2$ --; column 8, line 71, for "$y+\bar{y})=1$" read -- $y+\bar{y}=1$ --; line 73, for "$f_3=\bar{x}\bar{y}z+\bar{x}y\bar{z}+\overline{xz}$" read -- $f_3=\bar{x}\bar{y}z+\bar{x}y\bar{z}+xz$ --; column 9, line 43, for "$f=uz+\overline{uz}$ or $u=(x+yF_2+yF_3+F_4)$" read -- $f=uz+\bar{u}\bar{z}$ or $u=(x+yF_2+yF_3+F_4)$ --; column 10, line 19, for "pint" read -- point --; column 12, line 44, strike out "to", second occurrence.

Signed and sealed this 12th day of January 1965.

(SEAL)
Attest:

ERNEST W. SWIDER
Attesting Officer

EDWARD J. BRENNER
Commissioner of Patents